(12) United States Patent
Kasahara

(10) Patent No.: US 8,860,661 B2
(45) Date of Patent: Oct. 14, 2014

(54) INFORMATION PROCESSING APPARATUS AND PROGRAM

(75) Inventor: Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 150 days.

(21) Appl. No.: 13/489,652

(22) Filed: Jun. 6, 2012

(65) Prior Publication Data

US 2012/0313851 A1 Dec. 13, 2012

(30) Foreign Application Priority Data

Jun. 13, 2011 (JP) .................................. 2011-131158

(51) Int. Cl.
| | | |
|---|---|---|
| G09G 5/00 | (2006.01) | |
| G06T 11/60 | (2006.01) | |
| G06K 9/00 | (2006.01) | |
| G06F 3/01 | (2006.01) | |

(52) U.S. Cl.
CPC . *G06F 3/01* (2013.01); *G06T 11/60* (2013.01); *G06K 9/00228* (2013.01); *G06F 2203/04803* (2013.01); *G06K 9/00* (2013.01); *G06F 2203/04806* (2013.01); *G06F 3/012* (2013.01); *G06K 9/00221* (2013.01)
USPC ........ 345/156; 345/163; 345/175; 178/18.01; 178/18.09

(58) Field of Classification Search
USPC ............ 345/156, 163, 175; 178/18.01–18.09
See application file for complete search history.

(56) References Cited

U.S. PATENT DOCUMENTS

| | | | |
|---|---|---|---|
| 2006/0001645 A1* | 1/2006 | Drucker et al. ................ | 345/156 |
| 2010/0259473 A1* | 10/2010 | Sakata et al. ................... | 345/156 |

FOREIGN PATENT DOCUMENTS

JP 2009-238061 10/2009

OTHER PUBLICATIONS

U.S. Appl. No. 13/484,871, filed May 31, 2012, Kasahara, et al.

* cited by examiner

*Primary Examiner* — Shaheda Abdin
(74) *Attorney, Agent, or Firm* — Oblon, Spivak, McClelland, Maier & Neustadt, L.L.P.

(57) ABSTRACT

An information processing apparatus includes an imaging unit, a display, a detection unit, and an image generation unit. The imaging unit is configured to capture an image to acquire a captured image. The display has a display surface that faces in the same direction as an imaging direction of the imaging unit. The detection unit is configured to perform imaging processing on the captured image to detect a face region that is a region of a face of a user in the captured image. The image generation unit is configured to generate a display image displayed on the display based on a result of the detection by the detection unit.

17 Claims, 6 Drawing Sheets

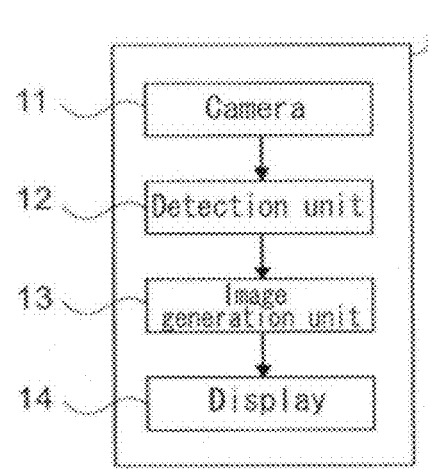
FIG.1
FIG.2
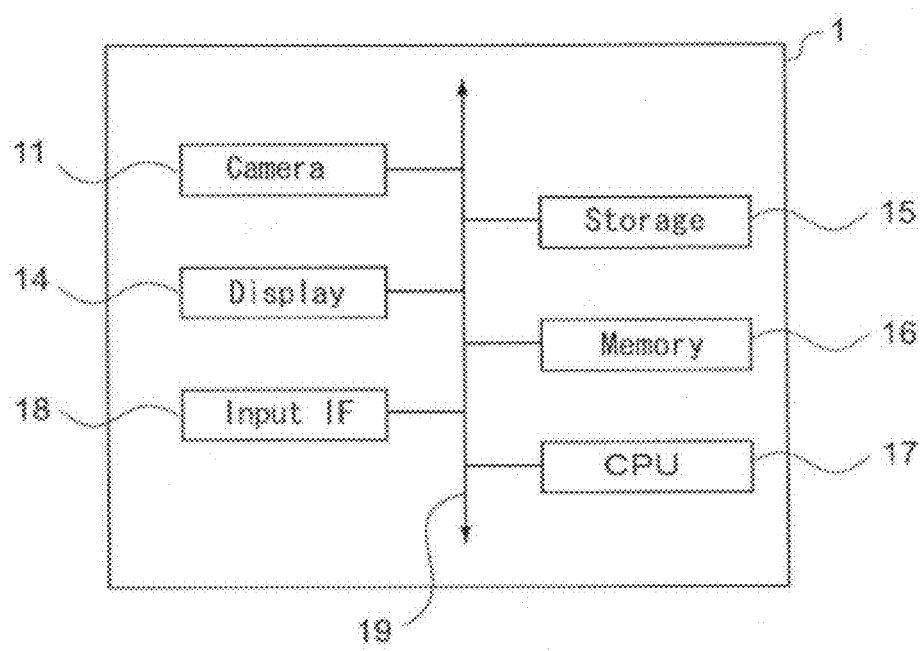

INFORMATION PROCESSING APPARATUS AND PROGRAM

BACKGROUND

The present disclosure relates to an information processing apparatus including an imaging unit and a display, and to a program therefor.

In recent years, along with the widespread use of personal digital assistants and tablet PCs (Personal Computers), in combination with expansion of user groups thereof, improvement on usability of such apparatuses has been increasingly demanded. Specifically, there are demands for reduction in necessary operation of a user to a minimum, achievement of an intuitive operation by a user, and the like.

For example, Japanese Patent Application Laid-open No. 2009-238061 (paragraph [0013], FIG. 1)(hereinafter, referred to as Patent Document 1) discloses an information processing apparatus including a user detection sensor. When the user detection sensor detects a user, the information processing apparatus automatically returns from a power saving mode. The information processing apparatus is configured to display a predetermined interface screen without receiving operations from a user.

SUMMARY

However, it is considered that the information processing apparatus as disclosed in Patent Document 1 reacts even when a user passes in the vicinity of the apparatus. For example, it is considered that such a problem is overcome if a detection distance of the user detection sensor is shortened. Conversely, however, there arises a problem that the apparatus does not react until the user comes very close to the apparatus.

In view of the circumstances as described above, it is desirable to provide an information processing apparatus with high usability and a program therefor.

According to an embodiment of the present disclosure, there is provided an information processing apparatus including an imaging unit, a display, a detection unit, and an image generation unit.

The imaging unit is configured to capture an image to acquire a captured image.

The display has a display surface that faces in the same direction as an imaging direction of the imaging unit.

The detection unit is configured to perform imaging processing on the captured image to detect a face region that is a region of a face of a user in the captured image.

The image generation unit is configured to generate a display image displayed on the display based on a result of the detection by the detection unit.

With this configuration, since the imaging direction of the imaging unit is set to a direction in which the display surface of the display faces, when a user intends to see the display surface, the face of the user naturally falls within an imaging range of the imaging unit. Therefore, since the image generation unit generates a display image based on a result of the detection by the detection unit, when the user intends to see the display surface, a predetermined display image can be displayed.

When the face region is detected by the detection unit, the image generation unit may superimpose a display object on the captured image to generate the display image.

With this configuration, a display image obtained by superimposing a display object (figure displayed in display image) on the captured image is generated. Since the captured image includes a face of the user, a display object is displayed in a display image together with a face image of the user. For example, display information items such as a schedule, the number of arrival of e-mail, and the like of the user are displayed in that display object, with the result that the user can refer to those display information items while seeing his/her face (using the display as a mirror).

The image generation unit may arrange the display object such that the display object is prevented from overlapping the face region.

In the case where the display image is an image obtained by superimposing the display object on the captured image, there is a possibility that the display object overlaps the face of the user included in the display image and the face of the user is hidden. Here, when the image generation unit arranges the display object so as not to overlap the face region, the face of the user can be prevented from being hidden by the display object.

The image generation unit may adjust a size of the display object such that the display object is prevented from overlapping the face region.

With this configuration, the face of the user can be prevented from being hidden by the display object.

The image generation unit may adjust a position of the display object such that the display object is prevented from overlapping the face region.

With this configuration, the face of the user can be prevented from being hidden by the display object.

The image generation unit may generate the display image including display information with information granularity defined in accordance with a size of the face region.

As described above, although the detection unit is for detecting the face region of the user in the captured image, the size of this face region indicates a distance between the user and the imaging unit. In the case where the face of the user is close to the display, the user can see the display image in detail (even with small characters). However, in the case where the face of the user is distant from the display, the user is difficult to see the display image in detail. Therefore, the image generation unit defines information granularity (fineness of details in information) of the display information in accordance with the size of the face region, with the result that the user can refer to the display information with information granularity corresponding to a distance between the display and the face.

The image generation unit may refer to a feature of a face of a user registered in advance to identify an individual user included in the captured image, and generate the display image including display information corresponding to the individual user.

With this configuration, the image generation unit generates a display image including display information for each user facing the display. Therefore, the user can see his/her own display information and can prevent display information that the user does not want another user to see to be displayed even when another user faces the display. This is effective in the case where, for example, a plurality of users share a single information processing apparatus.

When a plurality of face regions are detected in the captured image, the image generation unit may generate the display image including display information corresponding to the number of face regions.

With this configuration, the image generation unit can generate a display image including display information corresponding to the number of detected face regions, that is, the number of users included in the imaging range of the imaging unit. Therefore, the user can refer to display information corresponding to the number of users without separately inputting the number of users of the information processing apparatus.

The image generation unit may generate the display image including display information having a character size and the number of characters that are defined in accordance with the size of the face region.

With this configuration, the image generation unit can change a character size and the number of characters as information granularity defined in accordance with the size of the face region.

The image generation unit may generate the display image including display information as a display target image having a drawing range defined in accordance with the size of the face region.

With this configuration, the image generation unit can change a drawing range of a display target image as information granularity defined in accordance with the size of the face region.

When a plurality of face regions are detected in the captured image, the image generation unit may generate the display image including display information other than the display information corresponding to the individual user.

With this configuration, in the case where a plurality of users are included in the imaging range of the imaging unit, the image generation unit can be configured not to display the display information corresponding an individual user, that is, configured to ensure privacy and security of the user.

According to another embodiment of the present disclosure, there is provided a program causing a computer to function as:

a detection unit configured to perform imaging processing on a captured image captured by an imaging unit to detect a face region that is a region of a face of a user in the captured image; and an image generation unit configured to generate a display image displayed on a display facing in the same direction as an imaging direction of the imaging unit, based on a result of the detection by the detection unit.

According to another embodiment of the present disclosure, there is provided an information processing apparatus including a detection unit and an image generation unit.

The detection unit is configured to perform imaging processing on a captured image captured by an imaging unit to detect a face region that is a region of a face of a user in the captured image.

The image generation unit is configured to generate a display image displayed on a display facing in the same direction as an imaging direction of the imaging unit, based on a result of the detection by the detection unit.

As described above, according to the present disclosure, it is possible to provide an information processing apparatus with high usability and a program therefor.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 1 is a block diagram showing a functional configuration of an information processing apparatus according to a first embodiment of the present disclosure;

FIG. 2 is a block diagram showing a hardware configuration of the information processing apparatus;

DETAILED DESCRIPTION OF EMBODIMENTS

First Embodiment

Description will be given on an information processing apparatus according to a first embodiment of the present disclosure.

<Configuration of Information Processing Apparatus>

Figure 3:
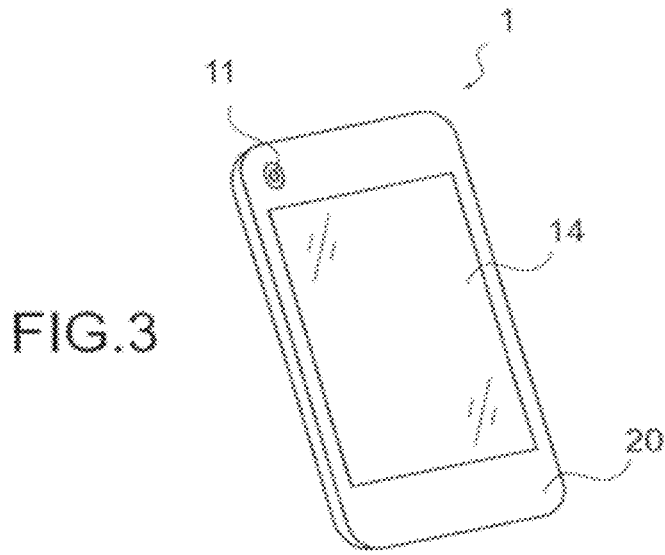
FIG. 3 is a perspective view showing an outer appearance of the information processing apparatus.

FIG. 1 is a block diagram showing a functional configuration of an information processing apparatus 1, and FIG. 2 is a block diagram showing a hardware configuration of the information processing apparatus 1. FIG. 3 is a perspective view showing an outer appearance of the information processing apparatus 1. Hereinafter, description will be given using a tablet PC (Personal Computer) as a specific example of the information processing apparatus 1, but the information processing apparatus 1 is not limited thereto. For example, the information processing apparatus 1 may be a personal digital assistant or a stationary PC.

As shown in FIG. 1, the information processing apparatus 1 includes a camera 11, a detection unit 12, an image generation unit 13, and a display 14, and those components are connected to one another.

The camera 11 is a camera capable of capturing a digital image. The camera 11 can be a camera capable of capturing a moving image as successive still images, for example, a camera using an imaging device such as a CMOS (Complementary Metal Oxide Semiconductor) or a CCD (Charge Coupled Device). Hereinafter, an image captured with the camera 11 is referred to as a "captured image".

The detection unit 12 performs image processing on the captured image and detects a region of a face of a user (hereinafter, referred to as face region) in the captured image. A specific detection operation by the detection unit 12 will be described later. The detection unit 12 outputs a result of the detection of the face region in the captured image to the image generation unit 13.

The image generation unit 13 generates a display image to be displayed on the display 14 based on the result of the detection. The generation of a display image by the image generation unit 13 will be described later.

The display 14 is a device capable of displaying an image. The display 14 may be a direct-view display such as an EL (Electroluminescence) display or a liquid crystal display, or may be a projection display such as a projector. Further, the display 14 can be a mirror display in which a transmissive display device is disposed on a mirror surface.

The display 14 has a display surface (display screen, projection surface of projector, mirror surface, etc.) that faces in the same direction as an imaging direction of the camera 11 (see FIG. 3). Specifically, the display 14 has a positional relationship with the camera 11, in which a face of a user falls within an imaging range of the camera 11 in the case where the user faces the display surface.

The functional configuration of the information processing apparatus 1 as described above is realized by the hardware configuration shown in FIG. 2. As shown in FIG. 2, the information processing apparatus 1 includes, in addition to the camera 11 and the display 14, a storage 15, a memory 16, a CPU (Central Processing Unit) 17, and an input IF (interface) 18. Those components above are connected to one another through a bus 19. It should be noted that the hardware configuration of the information processing apparatus 1 described herein is an example, and it is possible to adopt various configurations capable of realizing the functional configuration of the above-mentioned information processing apparatus 1.

The storage 15 is an auxiliary storage device such as an HDD (Hard Disk Drive) or an SSD (Solid State Drive) and stores programs to be subjected to computation processing by the CPU 17, data serving as "display information" to be described later, and the like.

The memory 16 is a main storage device such as a DRAM (Dynamic Random Access Memory) and stores programs read from the storage 15 by the CPU 17, results of computation processing, and the like.

The CPU 17 reads programs from the memory 16 and executes computation processing. In other words, the information processing apparatus 1 functions with the CPU 17 as a subject of operations.

The input IF 18 is an input interface of the information processing apparatus 1 and can be input devices such as a touch panel, a keyboard, and a mouse. In particular, in the case where the display 14 is a direct-view display, the input IF 18 can be a touch panel.

The information processing apparatus 1 shown in FIG. 3 includes the display 14 and the camera 11 that are provided to a casing 20. The input IF 18 is integrally formed with the display 14. The storage 15, the memory 16, the CPU 17, the input IF 18, and the bus 19 are accommodated in the casing 20.

<Operation of Information Processing Apparatus>

Description will now be given on an operation of the information processing apparatus 1.

Figure 4:
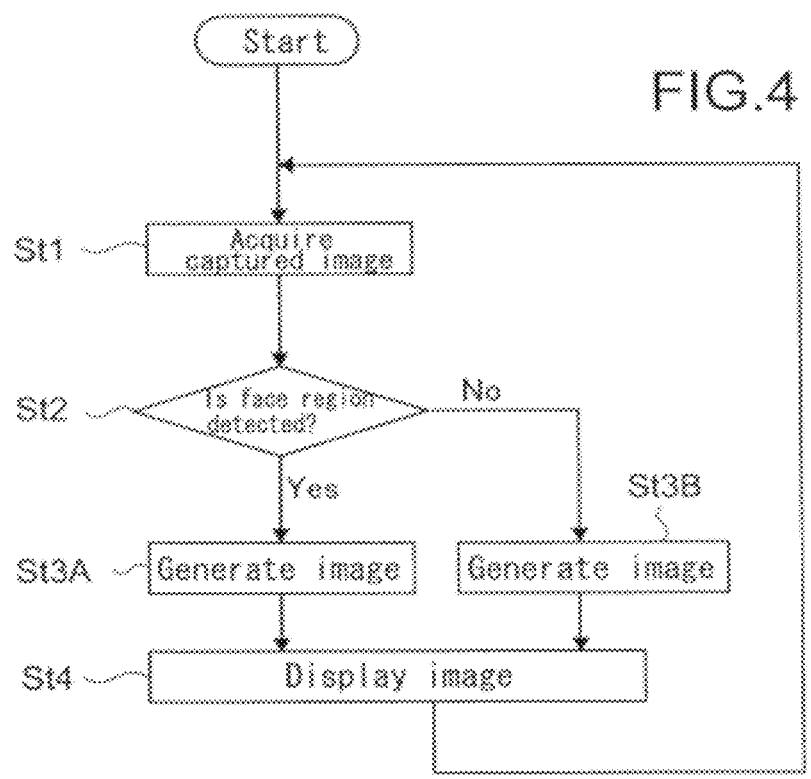
FIG. 4 is a flowchart showing an operation of the information processing apparatus.

FIG. 4 is a flowchart showing an operation of the information processing apparatus 1. FIG. 5 are diagrams showing examples of images by the operation of the information processing apparatus 1. Hereinafter, an operation of the information processing apparatus 1 will be described for each step (St) of the flowchart shown in FIG. 4.

Figure 5A:
FIG. 5 are diagrams showing examples of images by the operation of the information processing apparatus.

First of all, the camera 11 captures an image in an imaging direction thereof and acquires a captured image (St1). Imaging with use of the camera 11 may be successive (may capture images as a moving image) or may be intermittent (may capture several images per second, for example). Here, it is assumed that a captured image S shown in FIG. 5A is captured with the camera 11. It should be noted that the captured image S is an image to be internally processed in the information processing apparatus 1 and is not an image to be displayed on the display 14. The camera 11 outputs the captured image S to the detection unit 12.

The detection unit 12 performs detection processing of a "face region" on the captured image S (St2). The "face region" refers to a region that is recognized to be a face of a human in the detection unit 12. The detection unit 12 can detect a face region by template matching.

Specifically, the detection unit 12 binarizes the captured image S, processes the resultant image to a low-resolution image, and searches the image using a template representing a feature of a human face, to thereby detect a face region in the captured image S. In addition thereto, the detection unit 12 can detect a face image by various algorithms.

Figure 5B:
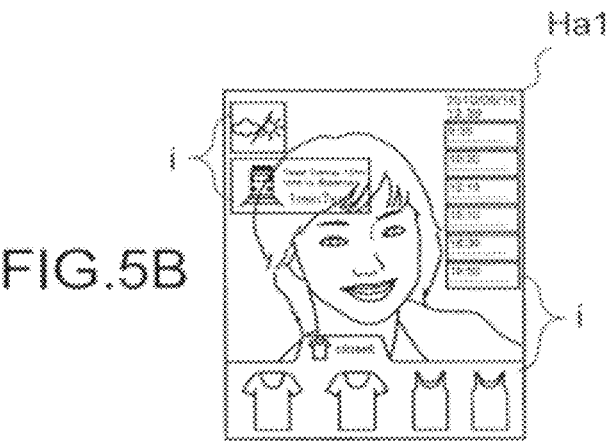

In the case where a face region is detected in Step 2 (St2: Yes), the image generation unit 13 generates a display image (St3A). FIG. 5B shows an example of a display image Ha (Ha1) generated by the image generation unit 13.

Specifically, the image generation unit 13 can generate a display image in which "display objects" i are superimposed on the captured image S. The display objects are each a figure displayed on the display image and can be various display information items provided to a user, such as gadgets (widgets) including a current time, a schedule, the number of arrival of e-mail, and the like. Further, examples of the display objects include GUIs (Graphical User Interfaces) such as icons that a user can select, and graphics generated by predetermined applications.

As shown in FIG. 5B, the image generation unit 13 can generate a display image Ha1 by superimposing the display objects i on the captured image S. Since the display image Ha1 is an image generated in the case where the captured image S includes a face of a user (St2: Yes), the display image Ha1 includes the face of the user and the display objects i.

Figure 5C:
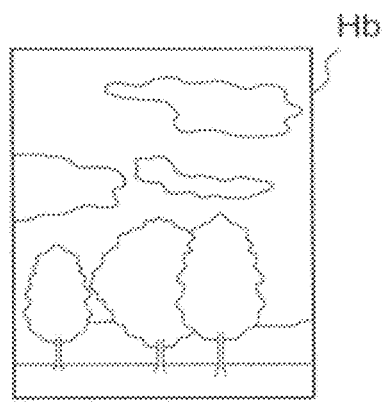

In the case where a face region is not detected in Step 2 (St2: No), the image generation unit 13 can generate a display image that does not include the display information items (St3B). FIG. 5C shows an example of a display image Hb generated by the image generation unit 13. The display image Hb can be, for example, a screen-saver or a photo image stored in the storage 15.

The image generation unit 13 outputs the display image Ha or display image Hb generated in Step 3A or 3B to the display 14. The display 14 displays the display image Ha or display image Hb output from the image generation unit 13 (St4). After that, the process is repeated again from acquisition of a captured image (St1).

The above operation of the information processing apparatus 1 will be described below along the operation of a user. In the case where the user is not close to the information processing apparatus 1, a face region is not detected in the captured image acquired with the camera 11 (St2: No), and therefore a display image Hb is displayed. At this time, the information processing apparatus 1 is assumed to function as a digital photo frame, for example.

When the user comes close to the information processing apparatus 1 and turns the face to the display 14, the face of the user falls within the imaging range of the camera 11, with the result that a face region is detected in the captured image (St2: Yes). Accordingly, a display image Ha is generated and displayed on the display 14. In other words, when the user merely turns the face to the display 14 within a certain distance range, a display image Ha can be displayed on the display 14.

The information processing apparatus 1 according to this embodiment performs the operation as described above. With the information processing apparatus 1, the user can display a display image Ha without performing any operation. On the other hand, when the user moves away from the information processing apparatus 1 and turns the face in another direction, the display of the display image Ha can be automatically terminated.

It should be noted that in this embodiment, the image generation unit 13 superimposes the display objects on the captured image S to generate the display image Ha, but it is not limited thereto. For example, in the case where the display 14 is a mirror display, the face of the user is reflected in the mirror. Therefore, the image generation unit 13 can generate only the display objects i as a display image. In addition, the image generation unit 13 can superimpose the display objects i on an image that is not associated with the captured image S to thereby generate a display image.

Further, in this embodiment, in the case where a face region is not detected in Step 2, the image generation unit 13 generates the display image Hb, but the image generation unit 13 can be configured not to generate any images. In this case, the information processing apparatus 1 does not display images (the display 14 is turned off) as long as a face of a user is not detected.

Second Embodiment

Description will be given on an information processing apparatus according to a second embodiment of the present disclosure. In the second embodiment, description on the same configurations and operations as those of the first embodiment will be omitted. The information processing apparatus according to this embodiment includes the same functional configuration and hardware configuration as those of the information processing apparatus 1 according to the first embodiment.

In the first embodiment, the image generation unit 13 generates, in the case where a face region is detected in the captured image S, the display image Ha obtained by superimposing the display objects i on the captured image S. The information processing apparatus 1 according to this embodiment is for adjusting a layout of the display objects i on the basis of a position of the face region in the captured image.

<Operation of Information Processing Apparatus>

Description will be given on an operation of the information processing apparatus 1 according to this embodiment.

FIG. 6 are diagrams showing examples of images by the operation of the information processing apparatus 1 according to this embodiment. Hereinafter, an operation of the information processing apparatus will be described for each step (St) of the flowchart shown in FIG. 4.

First of all, the camera 11 captures an image in an imaging direction thereof and acquires a captured image (not shown) (St1). The camera 11 outputs the captured image to the detection unit 12.

The detection unit 12 performs detection processing of a "face region" on the captured image (St2). The detection unit 12 can detect a face region by template matching.

In the case where a face region is detected in Step 2 (St2: Yes), the image generation unit 13 generates a display image obtained by superimposing the display objects i on the captured image S (St3A). FIGS. 6A, 6B, 6C, and 6D show display images Ha (Ha2, Ha3, Ha4, and Ha5), respectively, generated by the image generation unit 13.

The image generation unit 13 adjusts an arrangement (layout) of the display objects i so as not to overlap the face region detected by the detection unit 12 and superimposes the display objects i on the captured image, to thereby generate a display image Ha.

Figure 6A:
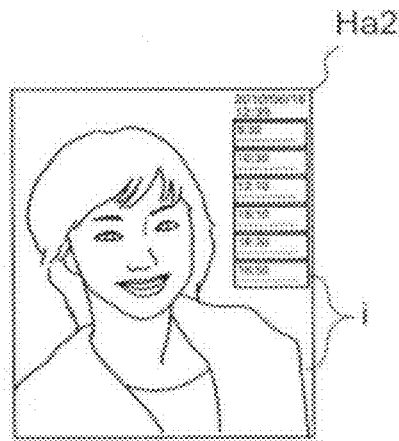
FIG. 6 are diagrams showing examples of images by an operation of an information processing apparatus according to a second embodiment of the present disclosure.
Figure 6B:
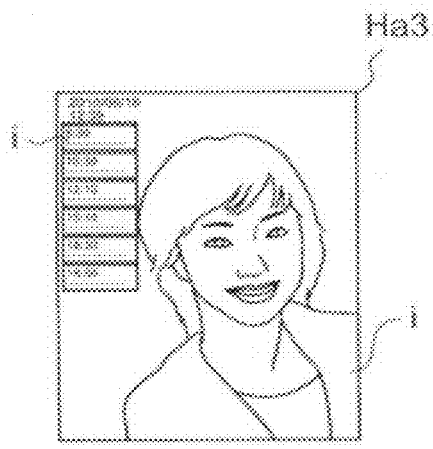

Specifically, the image generation unit 13 can arrange the display objects i so as not to overlap the face region detected by the detection unit 12, as shown in FIGS. 6A and 6B. In the display image Ha2 shown in FIG. 6A and the display image Ha3 shown in FIG. 6B, the position of the display objects i is changed with respect to the position of the face of the user.

Figure 6C:
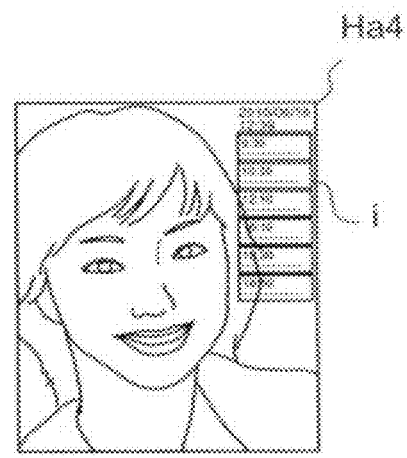
Figure 6D:
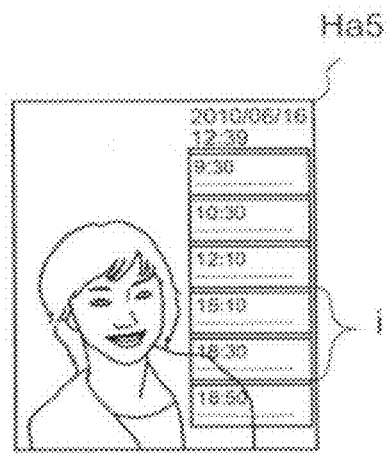

Further, as shown in FIGS. 6C and 6D, the image generation unit 13 can increase or decrease the size of the display objects i (including the size of characters and the like) in a range in which the display objects i do not overlap the face region. In the display image Ha4 shown in FIG. 6C and the display image Ha5 shown in FIG. 6D, the size of the display objects i is changed in accordance with the size of the face of the user (in accordance with a distance between the user and the information processing apparatus 1).

In the case where a face region is not detected in Step 2 (St2: No), the image generation unit 13 can generate a display image Hb (see FIG. 5C) that does not include the display information items (St3B).

The image generation unit 13 outputs the display image Ha or display image Hb generated in Step 3A or 3B to the display 14. The display 14 displays the display image Ha or display image Hb output from the image generation unit 13 (St4). After that, the process is repeated again from acquisition of a captured image (St1).

The above operation of the information processing apparatus 1 will be described below along the operation of a user. In the case where the user is not close to the information processing apparatus 1, a face region is not detected in the captured image acquired with the camera 11 (St2: No), and therefore a display image Hb is displayed. When the user comes close to the information processing apparatus 1 and turns the face to the display 14, the face of the user falls within the imaging range of the camera 11, with the result that a face region is detected in the captured image (St2: Yes). Accordingly, a display image Ha is generated and displayed on the display 14. In other words, when the user merely turns the face to the display 14 within a certain distance range, display of the display image Ha is started.

Further, since the display objects i are arranged so as not to overlap the face of the user in this embodiment, the face of the user imaged by the camera 11 is displayed without being hidden by the display objects i. Further, also in the case where a relative position of the user to the camera 11 is varied, the arrangement of the display objects i is adjusted in accordance with the variation, and the face of the user is constantly displayed without being hidden by the display objects i. Therefore, the user can see his/her own face without being interrupted by the display objects i.

Third Embodiment

Description will be given on an information processing apparatus according to a third embodiment of the present disclosure. In the third embodiment, description on the same configurations and operations as those of the first embodiment will be omitted. The information processing apparatus according to this embodiment includes the same functional configuration and hardware configuration as those of the information processing apparatus 1 according to the first embodiment.

In the first embodiment, the image generation unit 13 generates the display image Ha in the case where a face region is detected in the captured image S. The information processing apparatus 1 according to this embodiment is for adjusting information granularity of display information items on the basis of the size of the face region.

<Operation of Information Processing Apparatus>

Description will be given on an operation of the information processing apparatus 1 according to this embodiment.

FIG. 7 are diagrams showing examples of images by the operation of the information processing apparatus 1 according to this embodiment. Hereinafter, an operation of the information processing apparatus will be described for each step (St) of the flowchart shown in FIG. 4.

First of all, the camera 11 captures an image in an imaging direction thereof and acquires a captured image (not shown) (St1). The camera 11 outputs the captured image to the detection unit 12.

The detection unit 12 performs detection processing of a "face region" on the captured image (St2). The detection unit 12 can detect a face region by template matching.

Figure 7A:
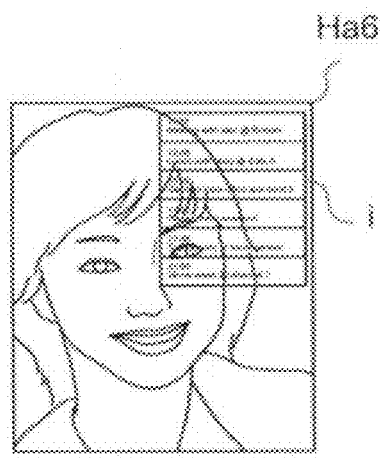
FIG. 7 are diagrams showing examples of images by an operation of an information processing apparatus according to a third embodiment of the present disclosure.
Figure 7B:
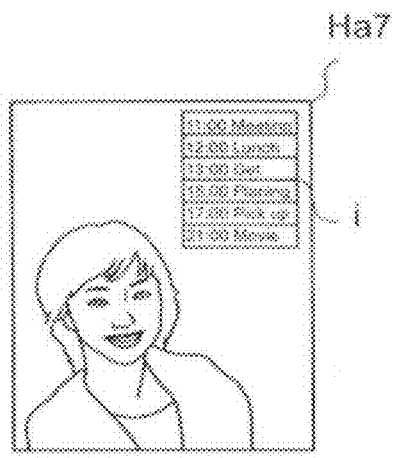
Figure 7C:
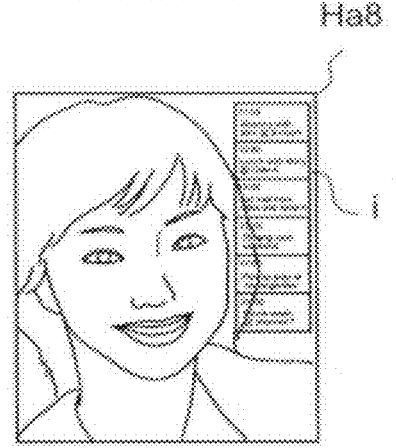

In the case where a face region is detected in Step 2 (St2: Yes), the image generation unit 13 generates a display image obtained by superimposing the display objects i on the captured image (St3A). FIGS. 7A, 7B, and 7C show display images Ha (Ha6, Ha1, and Ha8), respectively, generated by the image generation unit 13.

The image generation unit 13 defines "information granularity" of display information items on the basis of the size of the face region in the captured image, the face region being detected by the detection unit 12, and generates a display image Ha. The information granularity refers to fineness of details in display information items. Information with small information granularity is detailed information, and information with large information granularity is simplified information. Specifically, the information granularity can be set to be the number of characters and character size of display information items and a drawing range of an image to be displayed.

In the case where the detected face region is large (user is close to the camera 11), the image generation unit 13 generates a display image including display objects i in which display information items with small information granularity are displayed. Further, in the case where the detected face region is small (user is distant from the camera 11), the image generation unit 13 generates a display image including display objects i in which display information items with large information granularity are displayed. FIG. 7A shows a display image Ha6 in the case where the face region is large, and FIG. 7B shows a display image Ha7 in the case where the face region is small.

In the display image Ha6 shown in FIG. 7A, display objects i including display information items with small information granularity (e.g., detailed schedules) are displayed. In the display image Ha7 shown in FIG. 7B, display objects i including display information items with large information granularity (e.g., simplified schedules) are displayed. Further, the image generation unit 13 may arrange the display objects i so as not to overlap the face region as shown in FIG. 7C, similarly to the case of the second embodiment, to thereby generate a display image Ha8.

It should be noted that in this embodiment, the display information items may not necessarily be displayed in the display objects i, and only display information items in which information granularity is defined based on the size of the face region can be displayed on the display 14. In the above example, a schedule is exemplified as a display information item. However, map information at a large scale can be set to a display image as display information items with small information granularity, and map information at a small scale can be set to a display image as display information items with large information granularity.

In the case where a face region is not detected in Step 2 (St2: No), the image generation unit 13 can generate a display image Hb (see FIG. 5C) that does not include the display information items (St3B).

The image generation unit 13 outputs the display image Ha or display image Hb generated in Step 3A or 3B to the display 14. The display 14 displays the display image Ha or display image Hb output from the image generation unit 13 (St4). After that, the process is repeated again from acquisition of a captured image (St1).

The above operation of the information processing apparatus 1 will be described below along the operation of a user. In the case where the user is not close to the information processing apparatus 1, a face region is not detected in the captured image acquired with the camera 11 (St2: No), and therefore a display image Hb is displayed. When the user comes close to the information processing apparatus 1 and turns the face to the display 14, the face of the user falls within the imaging range of the camera 11, with the result that a face region is detected in the captured image (St2: Yes). Accordingly, a display image Ha is generated and displayed on the display 14. In other words, when the user merely turns the face to the display 14 within a certain distance range, display of the display image Ha is started.

Further, in this embodiment, the information granularity of display information items is changed in accordance with the size of the face region in the captured image, that is, a distance between the user and the camera 11. The user can see simplified (user-friendly) display information items in the case where a distance from the camera 11 is large, and can see detailed display information items in the case where the distance from the camera 11 is short. In other words, the user can change the information granularity of display information items by bringing the face close to or away from the camera 11, without directly operating the information processing apparatus 1.

Fourth Embodiment

Description will be given on an information processing apparatus according to a fourth embodiment of the present disclosure. In the fourth embodiment, description on the same configurations and operations as those of the first embodiment will be omitted. The information processing apparatus according to this embodiment includes the same functional configuration and hardware configuration as those of the information processing apparatus 1 according to the first embodiment.

In the first embodiment, the image generation unit 13 generates a display image Ha in the case where a face region is detected in the captured image. The information processing apparatus 1 according to this embodiment is for identifying a user on the basis of a detected face region and selecting display information items for each user.

<Operation of Information Processing Apparatus>

Description will be given on an operation of the information processing apparatus 1 according to this embodiment.

FIG. 8 are diagrams showing examples of images by the operation of an information processing apparatus 1 according to this embodiment. Hereinafter, an operation of the information processing apparatus will be described for each step (St) of the flowchart shown in FIG. 4.

First of all, the camera 11 captures an image in an imaging direction thereof and acquires a captured image (St1). The camera 11 outputs the captured image to the detection unit 12.

The detection unit 12 performs detection processing of a "face region" on the captured image (St2). The detection unit 12 can detect a face region by template matching.

Figure 8A:
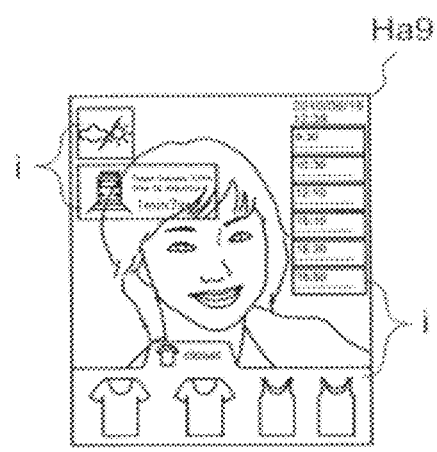
FIG. 8 are diagrams showing examples of images by an operation of an information processing apparatus according to a fourth embodiment of the present disclosure.
Figure 8B:
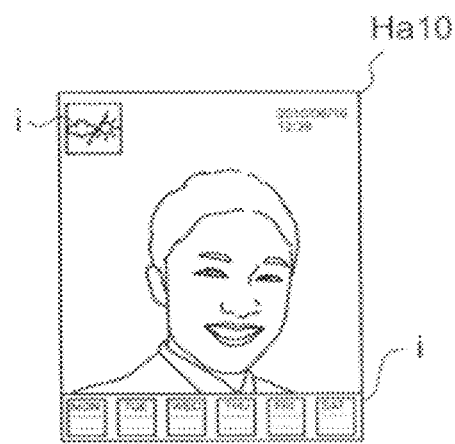

In the case where a face region is detected in Step (St2: Yes), the image generation unit 13 generates a display image including the display information items described above (St3A). FIGS. 8A and 8B show display images Ha (Ha9 and Ha10), respectively, generated by the image generation unit 13.

The image generation unit 13 executes user identification processing on the captured image. The user identification processing is performed by comparing information on a face image of a user, which is registered in advance, with the captured image. The information on a face image of a user refers to characteristic information in an image, for example, an interval of eyes of the user. Such user identification processing based on the face image can be performed using various algorithms.

The image generation unit 13 selects display information items to be displayed in the display objects i, in accordance with the user identified as described above. Specifically, for example, individual schedules, arrival of e-mail, and the like can be selected for each user. Further, display information items to be shared between a plurality of users can be selected even when any one of the users is identified.

FIG. 8A shows a display image Ha9 generated in the case where a certain user is identified, and FIG. 8B shows a display image Ha10 generated in the case where another user is identified.

As described in the second and third embodiment, the image generation unit 13 may superimpose the display objects i on the captured image so as not to overlap the face region, or may change information granularity in accordance with the size of the face region.

It should be noted that in this embodiment, the display information items may not necessarily be displayed in the display objects i, and only display information items selected in accordance with the identified user can be displayed on the display 14.

In the case where a face region is not detected in Step 2 (St2: No), the image generation unit 13 can generate a display image Hb (see FIG. 5O) that does not include the display information items (St3B).

The image generation unit 13 outputs the display image Ha or display image Hb generated in Step 3A or 3B to the display 14. The display 14 displays the display image Ha or display image Hb output from the image generation unit 13 (St4). After that, the process is repeated again from acquisition of a captured image (St1).

The above operation of the information processing apparatus 1 will be described below along the operation of a user. In the case where the user is not close to the information processing apparatus 1, a face region is not detected in the captured image acquired with the camera 11 (St2: No), and therefore a display image Hb is displayed. When the user comes close to the information processing apparatus 1 and turns the face to the display 14, the face of the user falls within the imaging range of the camera 11, with the result that a face region is detected in the captured image (St2: Yes). Accordingly, a display image Ha including display objects i is generated and displayed on the display 14. In other words, when the user merely turns the face to the display 14 within a certain distance range, display of the display image Ha is started.

Further, in this embodiment, display information items to be displayed in the display image Ha are selected in accordance with an individual user identified in the captured image. For example, in the case where a plurality of users share a single information processing apparatus 1, each of the users can refer to information necessary to himself/herself without any input for logging in the single information processing apparatus 1. Further, display information items of one user are not displayed for another user, which is effective in terms of privacy and security.

Fifth Embodiment

Description will be given on an information processing apparatus according to a fifth embodiment of the present disclosure. In the fifth embodiment, description on the same configurations and operations as those of the first embodiment will be omitted. The information processing apparatus according to this embodiment includes the same functional configuration and hardware configuration as those of the information processing apparatus 1 according to the first embodiment.

In the first embodiment, the image generation unit 13 generates a display image Ha in the case where a face region is detected in the captured image. The information processing apparatus 1 according to this embodiment is for selecting display information items with use of the number of detected face regions (the number of users).

<Operation of Information Processing Apparatus>

Description will be given on an operation of the information processing apparatus 1 according to this embodiment.

Hereinafter, an operation of the information processing apparatus will be described for each step (St) of the flowchart shown in FIG. 4.

First of all, the camera 11 captures an image in an imaging direction thereof and acquires a captured image (St1). The camera 11 outputs the captured image to the detection unit 12.

The detection unit 12 performs detection processing of a "face region" on the captured image (St2). The detection unit 12 can detect a face region by template matching.

In the case where a face region is detected in Step 2 (St2: Yes), the image generation unit 13 generates a display image including the display information items described above (St3A).

The image generation unit 13 selects display information items to be displayed in the display objects i in accordance with the number of face regions detected by the detection unit 12, that is, in accordance with the number of users existing in the imaging range of the camera 11. Specifically, in the case where a plurality of face regions are detected, the image generation unit 13 can generate a display image including display information items for a large group of people, such as a display image of a game.

Further, the image generation unit 13 can also generate a display image that does not include predetermined display information items in terms of privacy and security. Furthermore, with use of the user identification information described in the fourth embodiment, the image generation unit 13 can also generate a display image that does not include predetermined display information items in the case where a specific user is included, or generate a display image that include predetermined display information items in the case where a specific user is included.

It should be noted that in this embodiment, the display information items may not necessarily be displayed in the display objects i, and only display information items selected in accordance with an identified user can be displayed on the display 14.

In the case where a face region is not detected in Step 2 (St2: No), the image generation unit 13 can generate a display image Hb (see FIG. 5C) that does not include the display information items (St3B).

The image generation unit 13 outputs the display image Ha or display image Hb generated in Step 3A or 3B to the display 14. The display 14 displays the display image Ha or display image Hb output from the image generation unit 13 (St4). After that, the process is repeated again from acquisition of a captured image (St1).

The above operation of the information processing apparatus 1 will be described below along the operation of a user. In the case where the user is not close to the information processing apparatus 1, a face region is not detected in the captured image acquired with the camera 11 (St2: No), and therefore a display image Hb is displayed. When the user comes close to the information processing apparatus 1 and turns the face to the display 14, the face of the user falls within the imaging range of the camera 11, with the result that a face region is detected in the captured image (St2: Yes). Accordingly, a display image Ha is generated and displayed on the display 14. In other words, when the user merely turns the face to the display 14 within a certain distance range, display of the display image Ha is started.

Further, in this embodiment, display information items to be displayed in the display image Ha are selected in accordance with the number of face regions detected in the captured image. Therefore, even when a plurality of users use the information processing apparatus 1 at the same time, an operation input such as register of the number of users is unnecessary, which is convenient. Further, in the case where a plurality of users are detected, predetermined display information items are prevented from being displayed, which is effective in terms of privacy and security.

The present disclosure is not limited to the above embodiments and can be variously modified without departing from the gist of the present disclosure.

It should be noted that the present disclosure can take the following configurations.

(1) An information processing apparatus, including:
an imaging unit configured to capture an image to acquire a captured image;
a display having a display surface that faces in the same direction as an imaging direction of the imaging unit;
a detection unit configured to perform imaging processing on the captured image to detect a face region that is a region of a face of a user in the captured image; and
an image generation unit configured to generate a display image displayed on the display based on a result of the detection by the detection unit.

(2) The information processing apparatus according to Item (1), in which
when the face region is detected by the detection unit, the image generation unit superimposes a display object on the captured image to generate the display image.

(3) The information processing apparatus according to Item (1) or (2), in which
the image generation unit arranges the display object such that the display object is prevented from overlapping the face region.

(4) The information processing apparatus according to any one of Items (1) to (3), in which
the image generation unit adjusts a size of the display object such that the display object is prevented from overlapping the face region.

(5) The information processing apparatus according to any one of Items (1) to (4), in which
the image generation unit adjusts a position of the display object such that the display object is prevented from overlapping the face region.

(6) The information processing apparatus according to any one of Items (1) to (5), in which
the image generation unit generates the display image including display information with information granularity defined in accordance with a size of the face region.

(7) The information processing apparatus according to any one of Items (1) to (6), in which
the image generation unit refers to a feature of a face of a user registered in advance to identify an individual user included in the captured image, and generates the display image including display information corresponding to the individual user.

(8) The information processing apparatus according to any one of Items (1) to (7), in which
when a plurality of face regions are detected in the captured image, the image generation unit generates the display image including display information corresponding to the number of face regions.

(9) The information processing apparatus according to any one of Items (1) to (8), in which
the image generation unit generates the display image including display information having a character size and the number of characters that are defined in accordance with the size of the face region.

(10) The information processing apparatus according to any one of Items (1) to (9), in which
the image generation unit generates the display image including display information as a display target image having a drawing range defined in accordance with the size of the face region.

(11) The information processing apparatus according to any one of Items (1) to (10), in which
when a plurality of face regions are detected in the captured image, the image generation unit generates the display image including display information other than the display information corresponding to the individual user.

(12) A program causing a computer to function as:
a detection unit configured to perform imaging processing on a captured image captured by an imaging unit to detect a face region that is a region of a face of a user in the captured image; and
an image generation unit configured to generate a display image displayed on a display facing in the same direction as an imaging direction of the imaging unit, based on a result of the detection by the detection unit.

The present disclosure contains subject matter related to that disclosed in Japanese Priority Patent Application JP 2011-131158 filed in the Japan Patent Office on Jun. 13, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
circuitry configured to:
capture an image to acquire a captured image;
control a display having a display surface that faces a same direction as an imaging direction of the circuitry;
perform image processing on the captured image and detect a face region in the captured image, the face region being a region of a face of a user in the captured image;
generate a display image to be displayed on the display based on a result of detection by the circuitry, the generated display image including the captured image of the user with the face region and display information corresponding to the captured image; and
arrange the display information corresponding to the captured image such that the display information is prevented from overlapping the face region,
wherein a size of the display information displayed on the display is inversely proportional to a size of the face region detected by the circuitry.

2. The information processing apparatus according to claim 1, wherein when the face region is detected by the circuitry, the circuitry is configured to superimpose the display information on the captured image to generate the display image.

3. The information processing apparatus according to claim 1, wherein
the circuitry is configured to adjust the size of the display information such that the display information is prevented from overlapping the face region.

4. The information processing apparatus according to claim 1, wherein
the circuitry is configured to adjust a position of the display information such that the display information is prevented from overlapping the face region.

5. The information processing apparatus according to claim 1, wherein
the circuitry is configured to generate the display image including the display information with information granularity defined in accordance with the size of the face region.

6. The information processing apparatus according to claim 5, wherein
the circuitry is configured to generate the display image including the display information,
the size of the display information corresponds to a character size of the display information and the amount of display information corresponds to a number of characters of the display information, and
the size of the display information and the amount of display information are defined in accordance with the size of the face region.

7. The information processing apparatus according to claim 5, wherein
the circuitry is configured to generate the display image including the display information as a display target image having a drawing range defined in accordance with the size of the face region.

8. The information processing apparatus according to claim 1, wherein
the circuitry is configured to refer to a feature of the face of the user registered in advance to identify the user included in the captured image, and generate the display image including the display information corresponding to the user.

9. The information processing apparatus according to claim 8, wherein
when a plurality of face regions are detected in the captured image, the circuitry generates the display image including display information other than the display information corresponding to the user.

10. The information processing apparatus according to claim 8, wherein the feature of the face of the user includes an interval between eyes of the user.

11. The information processing apparatus according to claim 1, wherein
when a plurality of face regions are detected in the captured image, the circuitry generates the display image including display information corresponding to the plurality of face regions.

12. The information processing apparatus according to claim 1, wherein the display information includes at least one of a current time, a user schedule, and an arrival of e-mail.

13. The information processing apparatus according to claim 1, wherein the size of the face region detected by the circuitry is inversely proportional to a distance between the user and the information processing apparatus.

14. The information processing apparatus according to claim 1, wherein the circuitry is configured to generate an other display image to be displayed on the display when the face region is not detected by the circuitry.

15. The information processing apparatus according to claim 14, wherein the other display image includes one of a screen-saver and a photo image stored in storage and does not include the display information.

16. The information processing apparatus according to claim 1, wherein the captured image and the display information are simultaneously displayed on the display.

17. A non-transitory computer-readable storage medium storing computer-readable instructions that, when executed by a computer, cause the computer to execute a method comprising:
performing, using circuitry, image processing on a captured image captured using the circuitry;
detecting a face region in the captured image, the face region being a region of a face of a user in the captured image;
generating a display image to be displayed on a display facing a same direction as an imaging direction of the circuitry, based on a result of detection by the circuitry, the generated display image including the captured image of the user with the face region and display information corresponding to the captured image; and
arranging the display information corresponding to the captured image such that the display information is prevented from overlapping the face region,
wherein a size of the display information displayed on the display is inversely proportional to a size of the face region detected by the circuitry.

* * * * *